United States Patent [19]

Johnson

[11] 4,003,835
[45] Jan. 18, 1977

[54] FITTINGS

[76] Inventor: Harley D. Johnson, 708-9th St. West, Bradenton, Fla. 33505

[22] Filed: Aug. 18, 1975

[21] Appl. No.: 605,450

[52] U.S. Cl. .............................. 210/232; 210/463; 285/338; 261/5

[51] Int. Cl.² ........................................ B01D 35/02

[58] Field of Search ............. 285/338, 346, 196, 8, 285/423, DIG. 24; 261/5; 210/232, 251, 435, 446, 448, 452, 463

[56] References Cited

UNITED STATES PATENTS

| 775,124 | 11/1904 | Christman | 285/338 X |
|---|---|---|---|
| 3,709,260 | 1/1973 | Windle | 285/338 X |
| 3,768,839 | 10/1973 | Thompson | 285/338 X |
| 3,936,081 | 2/1976 | Blumenkranz | 285/423 X |

FOREIGN PATENTS OR APPLICATIONS 445,990   1/1948   Canada .............................. 210/448

Primary Examiner—Frank W. Lutter
Assistant Examiner—William A. Cuchlinski, Jr.
Attorney, Agent, or Firm—Sherman Levy

[57] ABSTRACT

Fittings are provided for use as replacements in a carburetor that has stripped the threads in the casting. The fittings include a self-adjusting filter screen, a cone nut, a fitting body, and a seal member. In a modified form of the invention, there is provided a method of sealing that does not use the screen.

4 Claims, 9 Drawing Figures

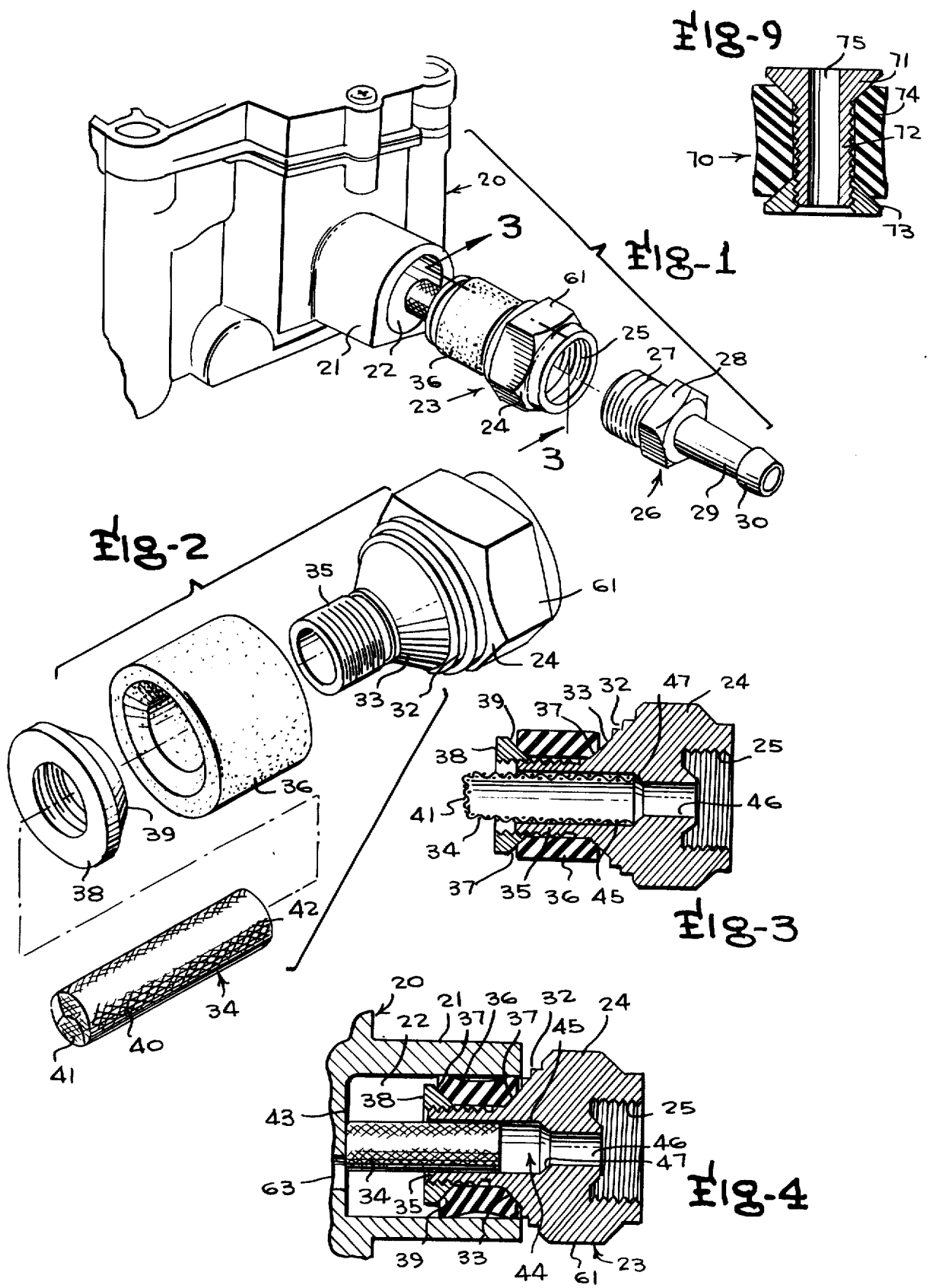

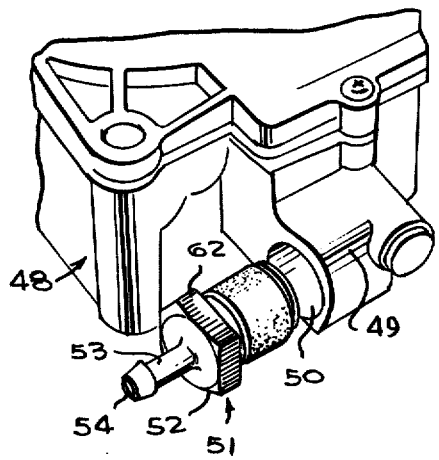
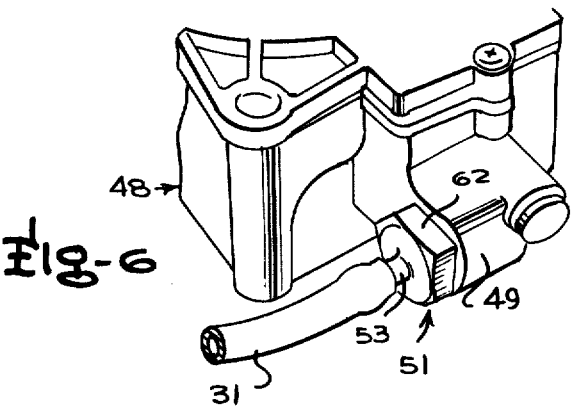
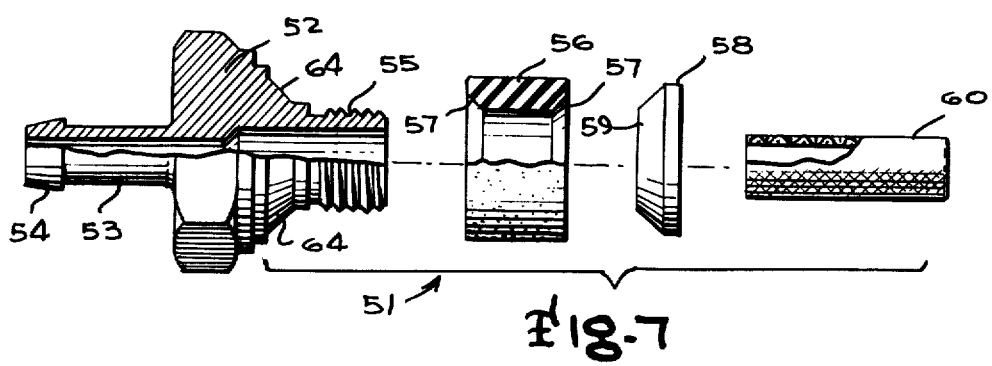
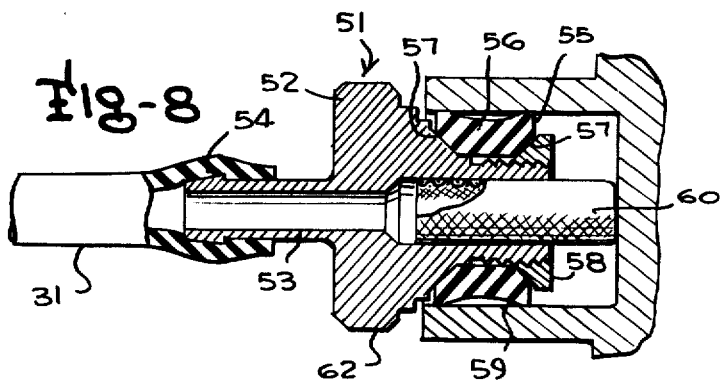

FITTINGS

BACKGROUND OF THE INVENTION

Field of the Invention

The present invention relates to carburetors and, more particularly, to fittings that are adapted to replace a fitting in a carburetor that has stripped the threads in the casting. The fittings of the present invention require no threads in the casting to secure the fittings in place. The fittings can use two different seal sizes to accommodate various sizes of members whereby the various types or sizes of carburetors that are currently used can be readily serviced.

The fittings use a self-adjusting filter screen that will automatically adjust to the cavity depth as may be required on various carburetors. The fittings also include a seal made of a suitable material such as Buna N or other elastomer so that when the seal is compressed between a 45° cone nut and a corresponding 45° chamfer on the fitting body, the edges of the seal will be forced upward and outward so that certain important advantages and results are produced.

In accordance with the present invention, there is provided a unique expendable seal fitting which will repair a stripped out casting without the need of any threads. The Buna seal acts both as a locking means and a seal to prevent leaks. The seal and nut have 45° chamfers or radii thereon and similar chamfers are provided on the main body of the fitting so that when the Buna seal is squeezed or tightened in the stripped out cavity, the seal action is forced up the 45° radius causing a sealing action as the edges of the seal arc in the proper direction.

The fitting of the present invention is further unique in that it is a universal fitting and will fit practically all ⅞ and 1 inch diameter fittings and wherein the fitting has a self-adjusting filter which adjusts itself as the cavity depth requires.

SUMMARY OF THE INVENTION

Fittings are provided for replacing various fuel nuts or fittings on carburetors. Also, while the original fitting has stripped the casting threads, the present invention needs no threads in the casting. The cost and effort and time required in installing the device is minimized. In many instances, fittings can be installed with the carburetor on the vehicle.

There is further provided other important features such as the fact that no threads are required in the casting to secure the device in place, and wherein the fittings will use a self-adjusting filter screen that automatically adjusts to the cavity depth as may be required on various carburetors.

The primary object of the present invention is to provide fittings for carburetors wherein the fittings have improved characteristics and advantages as compared to previous fittings.

Still another object of the present invention is to provide fittings that are ruggedly constructed and efficient to use and which are relatively simple and inexpensive to manufacture and install.

Other objects and advantages of the present invention will become apparent in the following specification when considered in the light of the attached drawings.

BRIEF DESCRIPTION OF THE DRAWINGS

FIG. 1 is a perspective view of a carburetor showing the parts separated for clarity of illustration and illustrating the parts of the fitting of the present invention.

FIG. 2 is an exploded perspective view of the fitting.

FIG. 3 is a sectional view taken on the line 3—3 of FIG. 1.

FIG. 4 is a view generally similar to FIG. 3 but showing the position of the parts with the fitting in the cavity of the carburetor and illustrating the locking action of the seal.

FIG. 5 is a perspective view of a modified construction wherein the adapter or nipple is integral with the fitting body instead of being a separate piece as in FIG. 1.

FIG. 6 is a perspective view of the device of FIG. 5 and wherein FIG. 6 shows the fitting in place and wherein FIG. 5 shows the fitting separated from the carburetor.

FIG. 7 is an exploded side elevational view of the fitting of FIGS. 5 and 6, with parts broken away and in section for clarity of illustration.

FIG. 8 is a side elevational view, with parts broken away and in section of the device of FIGS. 5, 6 and 7, and illustrating the position of the parts when the fitting is in engagement with the carburetor.

FIG. 9 is a sectional view of a modified or alternative form of the present invention.

DESCRIPTION OF THE PREFERRED EMBODIMENT

Referring in detail to the drawings and more particularly to FIGS. 1-4 of the drawings, the numeral 20 indicates a portion of a conventional carburetor that includes a casting portion 21 that has a cavity 22 therein. The numeral 23 indicates the fitting of the present invention, and the fitting 23 includes a body 24 that has an internally threaded portion 25, FIG. 3, in one end thereof.

The numeral 26 indicates an adapter that in FIGS. 1-4 is made as a separate piece from the body 24, and the adapter 26 has a threaded end portion 27 for threadedly engaging the threaded section 25 of the fitting body 24. The adapter 26 further includes a nut portion 28 as well as an extension 29 that has a flange or shoulder portion 30 thereon for receiving a fuel supply line or hose 31.

The fitting body 24 includes a stepped portion 32 as well as a 45° chamfered surface 33. The body 24 is provided with an externally threaded end portion 35. The numeral 36 indicates a seal of cylindrical formation that is adapted to be made of a suitable yieldable material such as Buna N, and the seal 36 has internal 45° chamfered edges 37 on its inner edge portions. The numeral 38 indicates a cone nut that is threaded internally, and the cone nut 38 is adapted to be arranged as shown in FIGS. 3-4, the cone nut 38 having a 45° chamfered surface 39 for co-action with one of the chamfered edges 37 of the seal 36. A self-adjusting filter screen 34 is provided as shown in the drawings and the screen 34 has a generally cylindrical formation. The screen 34 includes a cylindrical wall portion 40 as well as a closed end 41, while the opposite end 42 of the screen 40 is open. The end portion 41 of the filter screen 40 is adapted to abut a wall portion 43 of the carburetor as shown in FIG. 4 when the parts are in their proper assembled position.

The fitting body 24 is provided with a centrally disposed bore or passageway 44 that includes a first portion 45 as well as a second portion 46, and the portion 45 is of slightly larger diameter than the portion 46 whereby a shoulder 47 is defined between the portions 45 and 46, FIG. 4. As shown in FIG. 3, the inner end of the filter screen 34 can abut the shoulder 47.

Attention is now directed to FIGS. 5–8 of the drawings wherein the numeral 48 indicates a carburetor that has a casting portion 49 thereon, and the casting portion 49 has a cavity 50 therein. The numeral 51 indicates the fitting of the present invention, and the fitting 51 includes a body 52 that has an adapter or nipple 53 integral therewith instead of being a separate piece as shown in FIG. 1. The nipple 53 has a flange or shoulder portion 54 thereon whereby a fuel supply line or hose 31 will be properly held in place on the nipple or adapter 53.

The fitting body 52 includes an externally threaded end portion 55 that is adapted to have a seal 56 made of a material such as Buna N mounted thereon, and the seal 56 has edge portions 57 that are chamfered at an angle of approximately 45°. A cone nut 58 has a chamfered surface 59 that is also arranged at an angle of approximately 45°. The numeral 60 indicates a self-adjusting filter screen that serves the same purpose as the previously described screen 34.

As shown in FIGS. 1–4 the body 24 has flat surfaces 61 thereon whereby tools such as a wrench can be readily in engagement therewith for assembly or disassembly of the parts. Similarly, the fitting body 52 of FIGS. 5–8 has flat surfaces 62 thereon for the same purpose.

From the foregoing, it will be seen that there has been provided fittings that are adapted to be used as replacement parts on various carburetors, and whereas the original fittings have stripped the casting threads, the present invention needs no threads in the casting.

When using the fitting 23 shown in FIGS. 1–4, it will be understood that with the cavity 22 having its threads stripped the fitting 23 can be positioned or arranged as shown in FIG. 4 whereby with the cone nut 38 tightened on the threaded portion 35 the seal 36 will move from a position such as that shown in FIG. 3 to that such as shown in FIG. 4 so that the desired sealing and locking action will take place. It is to be understood that fuel such as gasoline is adapted to be supplied from a suitable source of supply through the hose or line 31. This fuel can then flow through the passageway in the adapter 26 and then through the passageway 44 and then through the filter screen 34 so that the fuel can enter the carburetor through an opening or aperture such as the aperture 63 shown in FIG. 4.

Similarly, when using the construction of FIGS. 5–8, the parts can be assembled as shown in FIG. 8 so that fuel can be supplied through the hose 31, and this fuel can flow through the nipple 53 that is integral with the fitting body 52. The fuel can enter the carburetor in the desired manner. The seal 56 is compressed so that it occupies a position such as that shown in FIG. 8 when the parts are in their proper assembled position. This action will take place due to the interacting or coacting chamfered surfaces 57 on the seal 56 and the chamfered edge or surface 59 on the cone nut 58 in conjunction with the chamfered surface 64 on the fitting body 52.

It is to be understood that the parts can be made of any suitable material and in different shapes and sizes as desired or required.

The fitting of the present invention is adapted to be used for replacing all ⅞ inch fuel nuts as used on various commercial carburetors; and whereas the original fitting has stripped the casting threads, the present invention needs no threads in the casting. Because carburetor castings such as Quadrajet carburetor castings are quite expensive, such castings can be repaired with the fittings or seals of the present invention for approximately one-tenth the cost of a new casting. In many instances, it can be installed with the carburetor on the vehicle. The present invention will fit practically all late model vehicles using a 1 inch fuel nut, and two different sizes may be required to service a ⅞ inch or 1 inch device.

The fittings are adapted to replace a fitting in a carburetor that has stripped the threads in the casting, and the fitting requires no threads in the casting to secure the same in place. It is to be noted that two fittings can use two different seal sizes to accommodate the ⅞ inch and 1 inch sizes required to service 95 percent of the carburetors that are currently being used. Further, the fittings use a self-adjusting filter screen which will automatically adjust to the cavity depth as may be required on various carburetors. The present invention is a unique expandable seal fitting which will repair a stripped out casting without the need of any threads. The Buna seal acts both as a locking means and a seal to prevent leaks. The seal and nut are so constructed with the 45° chamfer or radius on both the cone nut and the main body of the fitting so that when the Buna seal is squeezed or tightened in the stripped out cavity, the seal action is forced up the 45° radius causing a sealing action as the edges of the seal are forced outwardly. The fitting is unique in that it is a universal fitting that can be used on practically all ⅞ inch and 1 inch diameter fittings, and it is believed to be the only such fitting that has a self-adjusting filter which adjusts itself as the cavity depth may require.

With further reference to the sealing action and what actually happens to the Buna N seal when it is compressed between the 45° cone nut and the corresponding 45° chamfer on the fitting body, it will be noted that as shown in the drawings the edges of the seal are forced upward and outward first making contact with the cavity wall. It is this edge contact that makes the primary seal. Further tightening expands the center portion within the cavity to exert pressure on the inner walls so that the fitting is secured and sealed. The seal is made of a material such as Buna N that is not cellular.

The present invention needs no threads in the castings and provides a fuel inlet fitting with a filter and serves to stop fuel leaks, insures safety, provides a permanent fitting, and is easy to install so that it is a dependable repair part.

The device is a nipple type fitting for different diameter fuel hoses, and the device is an expanding sleeve seal fitting that requires no threads in the casting to secure. It is only necessary to push it in and tighten lightly. The device fits quadrajet, monojet, two and four barrel carburetors and the like; and the device comes complete with a filter screen which is self-adjusting for depth of filter cavity. The device is quick and easy to install whether the carburetor is on or off the automobile or other vehicle. The Buna seal requires only 25 pounds of torque to tighten instead of approximately 70 pounds on the original hard gasket. The Buna seal makes it easy on a weak casting.

As shown in FIG. 4, the area in the vicinity of the portion 25 has an inverted flare fitting formation.

FIGS. 1-4 illustrate a nipple type fitting that fits both a 5/16 and ⅜ inch fuel hose. FIGS. 6-8 illustrate a fitting such as a ⅜ inch inverted flare fuel fitting.

When using the device of FIGS. 1-4, it will be seen that there has been provided a device that comes complete with the filter screen and wherein the device is compact and reliable. With the carburetor on or off the car and even though the fuel nut may have stripped the casting threads, the present invention can be readily used. With the carburetor on or off the car, the old nut is removed and discarded. If the carburetor has a filter guide spike in the center of the casting, this is broken off at the base of the spike using pliers or the like. If the carburetors have guide ribs in the nut or filter cavity, these can be chipped down flush when room is needed to install the fitting. The old frayed chips can be blown out with air. Then it is only necessary to grasp the device at both ends and twist or tighten to expand the seal to the desired size so that it will have some drag when it is pushed into the casting. It should be expanded enough to go about half way in. The user then taps it the rest of the way in with a screw driver handle or other light instrument, and the device is tightened just enough to feel secure. Then the fuel line is connected and the job is done and the casting is saved. Similarly, the device of FIGS. 5-8 can be installed and used advantageously.

The present invention is light in weight. By making the seal of a material such as Buna N, it will be seen that it is compatible with all fossil fuels. The 45° chamfer on the parts is an important feature since this assures that the proper seal will be made.

Referring now to FIG. 9 of the drawings, there is illustrated a modified or alternative form of the invention that is indicated generally by the numeral 70 and wherein the numeral 71 indicates a body having a threaded end portion 72, and a cylindrical seal of yieldable material 74 surrounds the threaded end portion. A cone nut 73 is mounted on an end of the body 71 and engages the seal 74.

Thus, it will be seen that the construction of FIG. 9 does not use the self-adjusting filter screen. The arrangement of FIG. 9 provides a method of sealing and wherein certain of the parts can have the 45° chamfer. This is important because you are multiplying the torque. In effect, the present invention is a method of exerting increased pressure. Thus, in FIG. 9 the only thing that is needed is a means for securing the assembly in place in top of a casting or the like. It will be understood when using the device 70 of FIG. 9 in connection with a carburetor that a conventional needle valve, float and other usual parts are to be used in conjunction therewith and the needle is adapted to be arranged in a shell. Gasoline or other fuel can be supplied to the carburetor through the bore 75 in the body 71.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. A sealable fuel inlet fitting for connecting a fuel line to a carburetor having an open cavity with a generally cylindrical wall and a bottom wall, said fitting comprising a body having a portion for engaging said carburetor adjacent to said cavity, said body having a reduced threaded portion connected to said carburetor engaging portion by a chamfered frusto-conical surface, said reduced portion and said chamfered surface extending into said cavity, a cone nut threadedly engaging said reduced portion of said body, said cone nut having a chamfered frusto-conical surface in spaced facing relationship with said chambered surface of said body, a resilient generally tubular seal member having an outer wall with a diameter less than the diameter of the cylindrical wall of said cavity and an inner wall with a diameter greater than said reduced portion of said body, said seal member extending between said chamfered surfaces of said body and said cone nut, and said body having a bore extending axially therethrough, whereby said cone nut is rotated to squeeze said seal member and force the opposite ends outwardly to provide a snug fit with the cylindrical wall of said cavity after which said fitting is inserted into said cavity and said body is rotated to squeeze said seal member into sealing engagement with the cylindrical wall of said cavity, said body includes a counterbore extending inwardly through said reduced portion, and fuel filter means slidably mounted in said counterbore.

2. The structure of claim 1 in which said filter means includes a screen having one end adapted to engage said bottom wall of said cavity.

3. The structure of claim 1 including an outwardly extending nipple mounted on said body for receiving one end of a fuel supply line.

4. The structure of claim 3 in which said nipple is removably mounted on said body.

* * * * *